Sept. 26, 1967 M. A. FERGUSON 3,344,255
ELECTRICAL DISCHARGE MACHINE APPARATUS
Filed Nov. 20, 1963

INVENTOR.
Millard C. Ferguson
BY
Hugh L. Fisher
ATTORNEY

United States Patent Office 3,344,255
Patented Sept. 26, 1967

3,344,255
ELECTRICAL DISCHARGE MACHINING APPARATUS
Millard A. Ferguson, Utica, Mich., assignor to General Motors Corporation, Detroit, Mich., a corporation of Delaware
Filed Nov. 20, 1963, Ser. No. 325,054
7 Claims. (Cl. 219—69)

ABSTRACT OF THE DISCLOSURE

Electrical discharge machining apparatus employing a pair of parallel connected power supplies incorporating a transformer. The transformers each having their primaries connected to a common AC voltage source and their secondaries connected in series with a half-wave rectifier and across the machining gap. A phase switch is selectively operable to relate the transformers so that the outputs from the secondaries are either in phase to provide a low frequency, high current level gap discharge for rough machining or 180° out of phase to provide a doubled frequency, low current level gap discharge for finish machining.

---

This invention relates to improvements in electrical stock removal apparatus.

In general, when using the electrical stock removal process, commonly referred to as electrical discharge machining, the quality of the finish on the machined surfaces is to a considerable degree influenced by the characteristics of the power supplied to the machining gap. For example, if the power is supplied at a relatively low frequency and at a high current level a rough finish is produced. On the other hand, if a finer finish is wanted the current level is reduced and the frequency increased. Necessarily, in the later case the machining rate is substantially less. For this reason, to completely finish a workpiece it is often required to have two apparatuses, one for roughing and the other finish machining. Or, if a single apparatus is used, the power supply must initially be set for a roughing operation and subsequently completely readjusted for the finish machining operation. This readjustment usually requires a significant amount of time, which could otherwise be spent machining the workpiece.

To overcome the foregoing problems it is now proposed to provide electrical stock removal apparatus employing plural power supplies of such a character that they can be uniquely arranged so that with a minimum of adjustment a workpiece can either be rough or finish machined on a single apparatus.

More specifically, the invention contemplates electrical stock removal apparatus wherein plural power supplies are parallel connected between the machining gap and a single source. Then, by a novel provision the outputs from each power supply are so phase related that low frequency and high current level discharges are produced for rough machining, and higher frequency and lower current level discharges are provided for finish machining.

Figure 1:
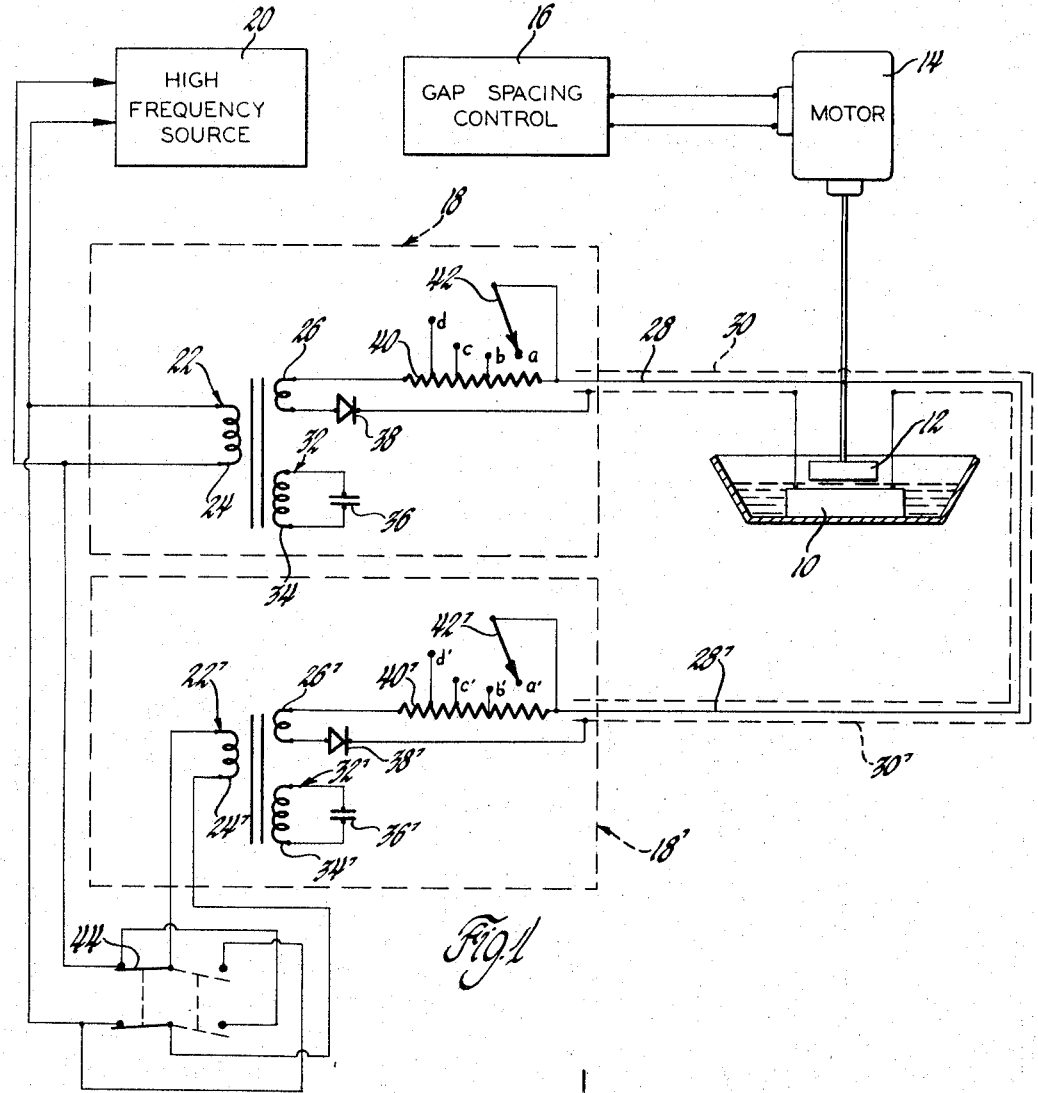
Figure 2:
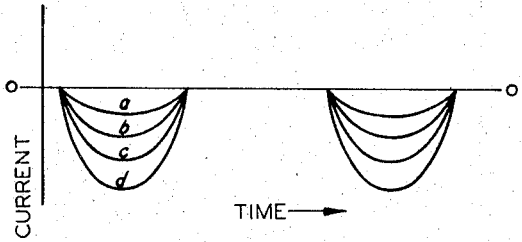
Figure 3:
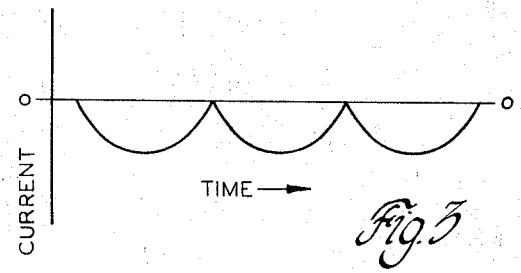

The foregoing and other objects and advantages of the invention will be apparent from the following description and the accompanying drawings, in which:

FIGURE 1 is a combined schematic and circuit diagram of an embodiment of the invention; and FIGURES 2 and 3 are graphical representations of the current applied to the gap during different conditions of operation.

Referring now to the drawings in detail and initially to FIGURE 1, the numerals 10 and 12 denote electrodes which will hereinafter be identified respectively as a workpiece and a cutting tool. The workpiece 10 and the cutting tool 12 are made of conductive material and are so positioned as to form a machining gap therebetween through which an appropriate dielectric fluid flows. When a voltage is applied to the gap, electrical stock removal discharges occur in a well known way causing the surface of the workpiece 10 to be machined with a contour that conforms to that of the cutting tool 12. The gap spacing between the workpiece 10 and the cutting tool 12 is maintained by a suitable motor 14 that may be operated by a gap spacing control 16 of a character that compares the actual gap voltage with a reference voltage and develops an error signal reflecting any difference. This error signal is applied to the motor 14 which in turn maneuvers the cutting tool 12 so as to readjust the gap spacing. The motor 14 and the gap spacing control 16 may be of the type more completely described in United States Patent No. 3,059,150. Also, if preferred, the workpiece 10 can be moved and the cutting tool 12 held stationary.

The polarities of the cutting tool 10 and the workpiece 12 will be determined by the application of the process. The customary practice is to have the cutting tool 12 serve as the cathode and the workpiece 10 as the anode. But these polarities can be reversed.

Power for the gap is furnished by two power supplies that, for convenience and simplicity, will be identified by the numerals 18 and 18'. Each power supply 18 and 18' is served by a single high frequency source 20, e.g., a motor-generator set operating in the 10 kc. range. Furthermore, for demonstration purposes the power supplies 18 and 18' are assumed to be substantially the same, thus each will have the same numerals for identifying corresponding parts except that the number for the power supply 18' will have the prime added. Hence, only the power supply 18 will be described in detail.

The power supply 18 includes an iron cored transformer 22 having a primary winding 24 that is electrically connected to the source 20 and a secondary winding 26 that is connected across the gap by way of conductor 28 and a coaxial cable 30. The transformer 22 also includes a tank circuit 32 comprising a winding 34 and a capacitor 36. The capacitor 36 is tuned near resonance with the frequency of the source and, therefore, draws enough leading current so that at full output or the maximum cutting rate, the load to the source is approximately at unity power factor. In the case of a motor-generator set this affords optimum loading. Moreover, the tank circuit 32 stores energy, and when required applies this to the winding 26, again to provide more effective operation. The secondary winding 26 has in the output thereof a unidirectional conducting device such as a rectifier 38 so poled as to afford half wave rectification. Also, the output of the secondary winding 26 has a resistor 40 manually or automatically operated by an adjustable tap 42 so as to control the current for a reason to become more apparent.

Provision is made for phase relating the outputs from the two power supplies 18 and 18' such that either rough or finish machining can be done without removing the workpiece 10 to another apparatus or without making a substantial readjustment of the power supplies 18 and 18'. In this embodiment this is done by what will hereinafter be referred to as a phase switch 44. Preferably, the phase switch is installed between the source 20 and the primary winding 24' of the transformer 22'. Of course, if preferred the phase switch 44 could be installed between the source 20 and the primary winding 24 of the transformer 22. The reason for installing the phase switch 44 at this point is to avoid the introduction of additional inductance between the gap and the secondary windings, and further because the currents at this point are smaller. The phase switch 44 is of any suitable type that has three positions, such as a double pole, double throw switch. In the illustrated full line position of the phase switch 44, full wave operation is provided for finish machining, whereas in the broken line position half wave operation, which is best suited for rough machining, is afforded, as will be explained.

Considering first rough machining, i.e., when it is desired to remove a maximum amount of material from the workpiece 10 without particular concern for the surface finish, this is initiated as just mentioned by placing the phase switch 44 in the broken line position. Assuming that both transformers 22 and 22' are identically wound, again for demonstration purposes only, the output from the secondary winding 26 will be exactly in phase with the output from the secondary winding 26'. If it is further assumed that the positive half cycles are discarded the output current pulses will appear as shown in FIGURE 2. In effect, the two outputs from the secondary windings 26 and 26' will be added and, hence, since the transformers 22 and 22' are identical, the current level at the gap will be doubled. This affords an obvious advantage since a lower frequency, high current level discharge is developed, which is essential for rough machining.

If now the workpiece 10 is to be finish machined after having been rough machined at the fast rate, the operator needs only to move the phase switch 44 from the broken line position to the solid line position. From an inspection of the transformers 22 and 22' it will be appreciated that the secondary windings 26 and 26' will have their outputs 180° out of phase. Consequently, the current supplied to the gap will in effect be full wave rectified and appear as viewed in FIGURE 3, again assuming that the positive half cycles are discarded. Since the current level is the same for both secondary winding outputs, it is one-half of that provided for rough machining, but the frequency is doubled. Desirably then, the finish machining can be carried out at a higher frequency and a lower current level.

This full wave rectification with the parallel connected power supplies 18 and 18' affords a loading advantage over a single power supply that is designed to furnish the same full wave rectified output. This is primarily because the tank circuit capacitor 36 does not perform as well when full wave current is being drawn due to the capacitive voltage being substantially lowered. Hence, the source and again if it is the motor-generator set sees a badly lagging load instead of the desired leading load. By using two parallel connected power supplies better source loading is achieved.

Additionally, the resistors 40 and 40' can, by respectively maneuvering the adjustable taps 42 and 42', enable an operator to make very accurate adjustments of the current level thus permitting even greater control over the finishes. These adjustments will provide, as shown in FIGURE 2, the indicated current levels which correspond to the a, b, c and d settings of the tap 42. Since the setting of the tap 42' also influences the summed output, the number of permitted adjustments is, in this embodiment, doubled. It must be kept in mind too that lower current levels both produce a finer finish and facilitate the control of overcut, i.e., the extent to which the workpiece 10 is machined oversize if this is a factor. Further variations can, of course, be achieved by altering the phase relationships and current levels as will be appreciated by those who are skilled in the art.

From the foregoing, it will be appreciated that with the described arrangement of the two power supplies either low frequency, high current level discharges for rough machining or high frequency, low current level discharges for finish machining can be obtained merely by repositioning a single switch. Moreover, from this arrangement several ancillary advantages result as have been discussed.

The invention is to be limited only by the following claims.

What is claimed is:
1. In electrical stock removal apparatus, the combination of conductive cutting tool and workpiece electrodes spaced apart so as to form an ionizable gap therebetween, plural parallel connected power supplies including a common alternating current source, each power supply having the output thereof applied to the gap so as to effect intermittent electrical stock removal discharges thereacross, means rectifying the outputs so as to be of the same certain frequency and polarity, and means selectively phase relating the rectified outputs so that for rough machining the outputs are in phase of the certain frequency and for finish machining the outputs are 180° out of phase and the frequency is double the certain frequency.

2. In electrical stock removal apparatus, the combination of conductive cutting tool and workpiece electrodes spaced apart so as to form an ionizable gap therebetween, plural parallel connected power supplies including a common source of alternating current voltage, each power supply having the output thereof applied to the gap so as to effect intermittent electrical stock removal discharges thereacross, each power supply also having means half wave rectifying the outputs, and means selectively phase relating the rectified outputs so that for rough machining the outputs are in phase and of the same polarity so as to be additive and provide a low frequency, high current level discharge and for finish machining the outputs are 180° out of phase and of the same polarity so as to be full wave rectified and provide a higher frequency, lower current level discharge.

3. In electrical stock removal apparatus, the combination of conductive cutting tool and workpiece electrodes spaced apart so as to form an ionizable gap therebetween, plural parallel connected power supplies including a common source of alternating current voltage, each power supply having the output thereof applied to the gap so as to effect intermittent electrical stock removal discharges thereacross, each power supply also having means rectifying the outputs so as to be of the same certain frequency and polarity, and means selectively phase relating the rectified outputs so that for rough machining the outputs have the certain frequency and are additive to furnish high current level discharges and for finish machining the outputs have a certain out-of-phase displacement so as to be at a higher frequency than the certain frequency and at a lower current level.

4. In electrical stock removal apparatus; the combination of conductive cutting tool and workpiece electrodes spaced apart so as to form an ionizable gap therebetween; plural power supplies including a source of alternating current voltage, a pair of transformers each having the primary winding thereof connected to the source and the secondary winding thereof connected across the gap, and unidirectional conducting devices associated with each secondary winding so as to half wave rectify the associated outputs from the associated secondary windings; and means selectively altering the relative polarities of the pair of transformers to thereby vary the phase relation of the outputs from the secondary windings so that for one condition of operation the outputs are substantially in phase to provide a high current level discharge and for another condition of operation the outputs are out of phase to provide a lower current level discharge.

5. In electrical stock removal apparatus; the combination of conductive cutting tool and workpiece electrodes spaced apart so as to form an ionizable gap therebetween; plural parallel connected power supplies including a source of alternating current voltage, a pair of transformers each having a primary winding connected to the source and a secondary winding connected across the gap, and unidirectional conducting devices associated with each secondary winding so as to half wave rectify the outputs from the associated secondary winding; and means selectively phase relating the outputs so that the outputs from the secondary windings are in phase and of the same polarity thus providing discharges at a low frequency and a high current level for rough machining and the outputs from the secondary windings are 180° out of phase and of the same polarity thus providing discharges at a higher frequency and at a lower current level for finish machining.

6. In electrical stock removal apparatus; the combination of conductive cutting tool and workpiece electrodes spaced apart so as to form an ionizable gap therebetween; plural parallel connected power supplies including a source of alternating current voltage, a pair of transformers each having the primary winding thereof connected to the source and the secondary winding thereof connected across the gap, and unidirectional conducting devices associated with each secondary winding so as to provide a half wave rectified output from the associated secondary winding; and means phase relating the outputs from the secondary windings; the phase relating means including switch means interposed between the source and the primary winding of one of the transformers so that in one position thereof the outputs from the secondary windings are in phase and of the same polarity so as to be additive and provide a low frequency, high current level discharge for rough machining and in another position thereof the outputs from the secondary windings are 180° out of phase and of the same polarity so as to provide a higher frequency, lower current level discharge.

7. In electrical stock removal apparatus; the combination of conductive cutting tool and workpiece electrodes spaced apart so as to form an ionizable gap therebetween; plural parallel connected power supplies including a source of alternating current voltage, a pair of transformers each having the primary winding thereof connected to the source and the secondary winding thereof connected across the gap, and unidirectional conducting devices associated with each secondary winding so as to half wave rectify the output from the associated secondary winding; and means phase relating the outputs from the secondary windings; the phase relating means including a selectively operable switch interposed between the source and the primary winding of one of the transformers; the switch being so arranged as to in one position thereof connect the primary winding of the one transformer so that the output from the one transformer secondary winding is in phase with the output from the other transformer secondary winding and of the same polarity so that the outputs are additive to furnish a low frequency, high current level discharge for rough machining and in another position thereof connect the one transformer primary winding to the source so that the one transformer secondary winding output is 180° out of phase with the output from the other transformer secondary winding thereby providing a higher frequency, lower current level discharge for finish machining.

References Cited
UNITED STATES PATENTS

| | | | |
|---|---|---|---|
| 2,895,080 | 7/1959 | Branker | 219—69 X |
| 2,901,588 | 8/1959 | McKechnie | 219—69 |
| 3,020,448 | 2/1962 | Fefer | 219—69 X |

ANTHONY BARTIS, *Primary Examiner.*

RICHARD M. WOOD, *Examiner.*

R. F. STAUBLY, *Assistant Examiner.*